May 17, 1927.
L. J. PULS
1,629,050
APPARATUS FOR TREATING GRAINS
Filed Nov. 24, 1925
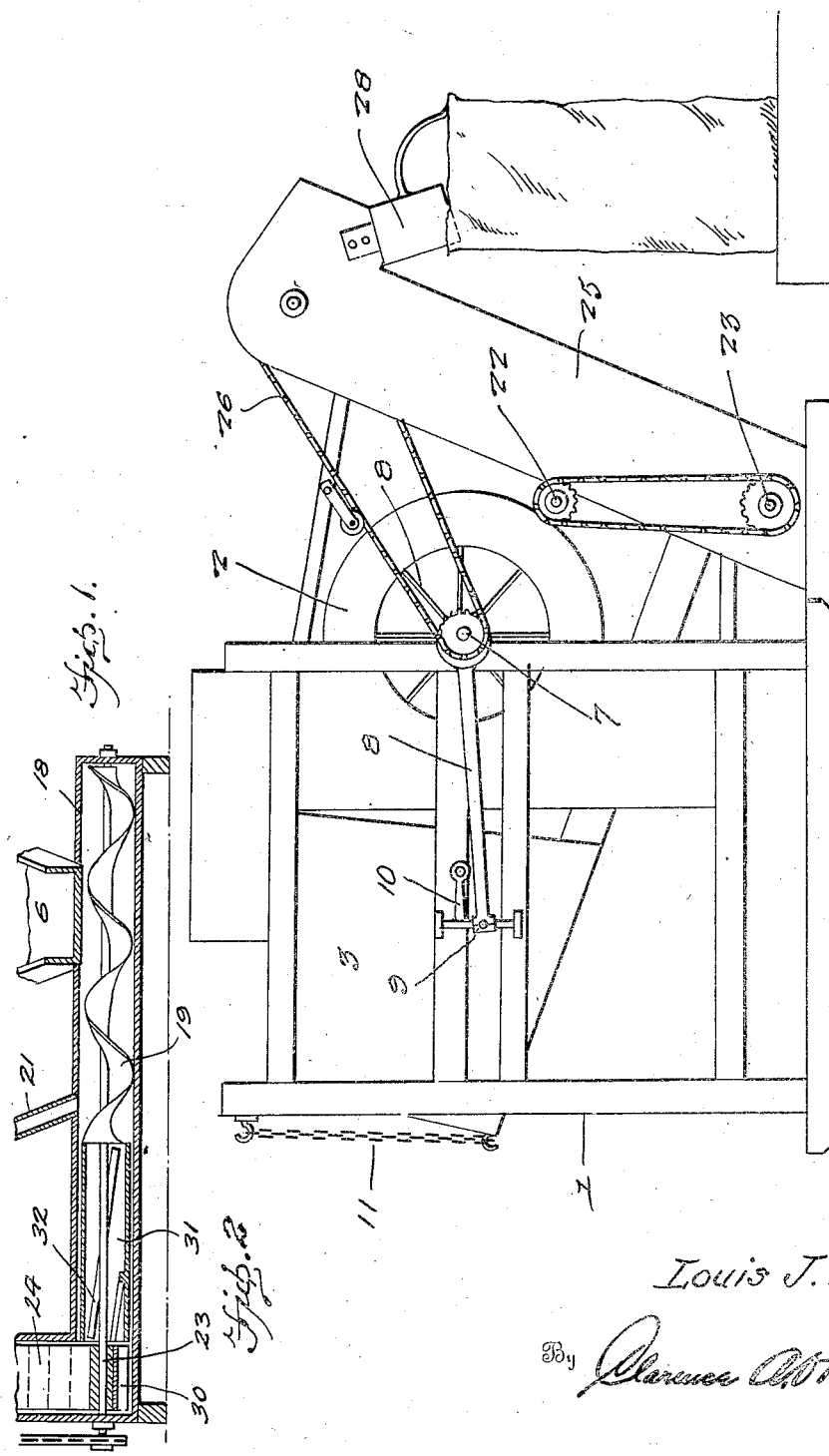

Patented May 17, 1927.

1,629,050

UNITED STATES PATENT OFFICE.

LOUIS J. PULS, OF WALLA WALLA, WASHINGTON.

APPARATUS FOR TREATING GRAINS.

Application filed November 24, 1925. Serial No. 71,115.

My present invention has to do with grains and more particularly grains designed for planting purposes; and the invention has for its general object the provision of an apparatus through the medium of which and in a continuing operation, grain is treated with powder calculated to prevent deterioration of the grain either before or after planting of the grain, the treatment of the grain immediately following the cleaning thereof, which is the preferred operation being highly advantageous inasmuch as the treatment agent is enabled to contact directly with the cleaned grain and hence is calculated to operate more efficaciously than would otherwise be the case.

To the attainment of the foregoing, the invention consists in the improvement as hereinafter described and definitely claimed.

In the accompanying drawings, forming part of this specification:—

Figure 1 is a side elevation showing the best practical embodiment of my invention of which I am cognizant.

Figure 2 is an enlarged fragmentary transverse section illustrative of the transverse conveying auger and the wings at the discharge end of said auger and constituting an important part of my invention, said view also showing the conduit through which the treatment agent, preferably in the form of powder, is supplied to the auger casing.

Similar numerals designate corresponding parts in both views of the drawings.

The preferred apparatus comprises a main frame 1 and a fan casing 2, the said casing 2 being arranged in working relation to a casing 3 of a transversely reciprocating element which in addition to the casing 3 includes an inclined trough 6. The apparatus also includes a transverse fan shaft 7 on which is fixed an appropriate fan 8 and power is taken from the said shaft 7 for the transverse reciprocation of the element referred to by means of an eccentric on the shaft 7 and a rod 8 having a strap receiving the said eccentric and also having connection at 9 with appropriate means 10 through the medium of which it is connected with the said reciprocating element. As best shown in Figure 1, the reciprocating element of the apparatus is suspended at one end from the main frame 1 through the medium of a chain 11 or any other appropriate flexible connection or connections. For the convenient supply of the grain to be fanned in the preferred apparatus thus far described I provide the hopper 12.

I employ a hopper or receptacle, not shown, in which is designed to be placed the powder or other agent used in the treatment of the grain, the treatment taking place after the thorough cleaning of the grain which is the preferred practice. A conduit 21 leads from the bottom of the said hopper or receptacle to the casing 18 so as to deliver the powder or other treatment agent to the auger near the delivery end of the latter.

In order to accelerate the discharge of powder or other treatment agent from the receptacle or hopper, I provide in the said receptacle or hopper an appropriate agitator operable through the medium of a shaft 22 which is designed to be driven from the shaft 23 of the auger 19. The shaft 23, also constitutes the lower shaft of an elevating belt, said belt being, in accordance with well known practice disposed in an elevator trunk 25 and being designed to be driven through the medium of a sprocket belt 26, and appropriate sprocket gears from the before mentioned shaft 7. The trunk 25 is preferably provided with duplex discharge spouts such as 28 so that grain may be delivered to two bags at one and the same time. This, however, is not of my invention and therefore the trunk 25 may have one or more discharge spouts in the discretion of the manufacturer of the apparatus.

The well of the elevator trunk 25 is designated by 30 in Figure 2, and it will be understood that the said well 30 is in full and free communication with the delivery end of the casing 18. This will be appreciated as an important advantage of my invention when it is stated that intermediate of the auger 19 and the said well 30 is a cylinder 31 in which are spiral fins or ribs 32. The heel end of the cylinder 31 is fixed with respect to the confronting end of the auger 19, and hence it will be readily apparent that the cylinder 31 and the ribs or fins in the cylinder will be rotated in concert with and by the auger. The conduit 21 for the supply of powder or other treatment agent is arranged as before described slightly in advance of the delivery end of the auger 19, and from this it follows that the commingled grain and treatment powder will be moved together and in intermixed state through the cylinder 31. During the traverse of the commingled grain and powder through the cylinder 31 the grain and each unit thereof will be thoroughly covered with the powder or in other words will be thoroughly dusted, the rotation of the grain and the powder in company therewith in the cylinder 31 contributing materially to the desired result, namely, the adequate covering of each piece of grain. Therefore, when the grain is delivered to the belt of the elevator 24, the grain will be in condition for planting and will also be in such a state due to the treatment that deterioration of the grain either before or after planting thereof or deterioration of the plants into which the grains develop will be practically precluded.

Notwithstanding the capacity of function ascribed to my novel apparatus, it will be readily appreciated that the said apparatus is simple in construction and is inexpensive and is well adapted to withstanding the usage to which apparatus of corresponding character is ordinarily subjected.

While I prefer the construction and relative arrangement of parts as herein disclosed, I do not desire to be understood as confining myself to said specific construction and relative arrangement of elements, my invention being defined by my appended claims within the scope of which changes in structure and arrangement may be made without departure from my invention.

Having described my invention, what I claim and desire to secure by Letters Patent, is:—

1. In combination a treatment casing, means for supplying power or other treatment agent to said casing, means in the casing at an intermediate point in the length thereof for feeding commingled grain and treatment agent, means in advance of the treatment agent feeding means in the casing for thoroughly commingling the grain and treatment agent, means in rear of the treatment agent feeding means for supplying grain to the treatment casing, and delivery means for receiving the treated grain from the casing; the feeding means in the casing being in the form of an auger, and the grains and treatment agent mixing means being in the form of a cylinder aligned with and fixed at its heel end to the delivery end of the auger and containing ribs or fins adapted to agitate and mix the grain and the treatment agent.

2. In combination grain feeding means, means for supplying a treatment agent to the grain while the same is under the influence of said feeding means, and means aligned and coupled with the feeding means and arranged in advance of the treatment agent supply means for mixing the grain and treatment agent and insuring the covering of the grain with the agent; the said grain feeding means including a casing and an auger rotatable in said casing, and the said mixing means being in the form of a cylinder open at both ends and having its heel end fixed to the delivery end of the auger and also having interior means for engaging and moving the grain and the powder.

3. In an apparatus for the purpose described, the combination of a casing, means for feeding grain toward one end of the casing, means for supplying grain to the casing and feeding means, means for supplying treatment agent to the casing and feeding means at a point in advance of the grain supply means, and means in advance of the treatment agent supply means for permitting movement of the grain and treatment agent to the delivery end of the apparatus and mixing the grain and treatment agent en route; the feeding means in the casing being in the form of an auger, and the mixing means being in the form of an open end cylinder at the forward end of the auger and provided with interior fins or blades.

4. An auger for the purpose described having at its forward end and rotatable and aligned with the auger an open end cylinder corresponding in diameter to the auger and provided with interior means for engaging and mixing grain and powder or other treatment agent.

5. In combination a casing, a grain feeding auger in the casing, means for conducting grain to the casing and auger, an open end cylinder fixed to the delivery end of the auger and corresponding in diameter to and rotatable with the auger in said casing and having interior means for engaging grain and treatment agent. means for supplying treatment agent to the casing at an intermediate point in the length of the casing and in advance of the said mixing means, a well in communication with the delivery end of the casing and the delivery end of the cylinder, and movable means for transferring treated grain from said well to a discharge point.

In testimony whereof I affix my signature.

LOUIS J. PULS.